United States Patent [19]

Higashi et al.

[11] Patent Number: 5,046,920
[45] Date of Patent: Sep. 10, 1991

[54] BEARING COOLING SYSTEM IN HORIZONTAL SHAFT WATER TURBINE GENERATOR

[75] Inventors: Izumi Higashi; Akio Adachi, both of Kanagawa, Japan

[73] Assignee: Fuji Electric Co., Ltd., Kanagawa, Japan

[21] Appl. No.: 482,054

[22] Filed: Feb. 20, 1990

[30] Foreign Application Priority Data

Feb. 23, 1989 [JP] Japan .................................... 1-43557
Mar. 9, 1989 [JP] Japan .................................... 1-57527
Jul. 6, 1989 [JP] Japan .................................... 1-174686

[51] Int. Cl.$^5$ .................................... F01D 25/08
[52] U.S. Cl. .................................... 415/111; 184/6.11; 184/104.1; 415/178; 415/179; 417/367; 384/316; 384/321; 384/476
[58] Field of Search .............. 415/111, 110, 112, 175, 415/177, 178, 179, 180; 384/313, 316, 317, 321, 476, 900; 417/367, 407; 184/6.11, 104.1

[56] References Cited

U.S. PATENT DOCUMENTS

| | | | |
|---|---|---|---|
| 1,841,604 | 1/1932 | Johnson | 417/367 |
| 2,257,011 | 9/1941 | Hiller | 415/175 |
| 2,910,328 | 10/1959 | Frölich | 415/175 |
| 4,261,165 | 4/1981 | Burgermeister | 384/317 |

FOREIGN PATENT DOCUMENTS

3328  1/1989  Japan .................................... 384/317

OTHER PUBLICATIONS

J. Miller, "Four Ways to Cool Hydraulic Oil", Hydraulics & Pneumatics, Jun. 1971, p. 69.

Primary Examiner—Edward K. Look
Assistant Examiner—Michael S. Lee
Attorney, Agent, or Firm—Finnegan, Henderson, Farabow, Garrett, and Dunner

[57] ABSTRACT

A bearing cooling system for a water turbine having a rotatable shaft connected at one end to a movable blade portion and supported by a journal bearing and by a thrust bearing having a collar, comprises a heat pipe including a first container surrounding and spaced from the rotatable shaft and extending axially from a predetermined engaging position adjacent the one end of the shaft to the journal and thrust bearings. The thrust bearing engages the outer surface of the first container, and the shaft and thrust bearing and inner surface of the container define walls of a sealed first chamber surrounding a portion of the rotatable shaft and communicating with the journal and thrust bearings. The system is adapted to include a fluid contained in the first chamber for absorbing heat generated by the journal and thrust bearings. A second container is spaced from and surrounds a portion of the first container adjacent the one end of the shaft. The first and second container together define a second chamber for receiving and containing flowing water from the turbine for cooling the fluid in the first chamber.

12 Claims, 10 Drawing Sheets

BEARING COOLING SYSTEM IN HORIZONTAL SHAFT WATER TURBINE GENERATOR

BACKGROUND OF THE INVENTION

1. Field of the Invention

The present invention relates to a bearing cooling system in which a heat pipe is formed in a rotary shaft of a horizontal shaft water turbine generator.

2. Description of the Prior Art

Figure 26:
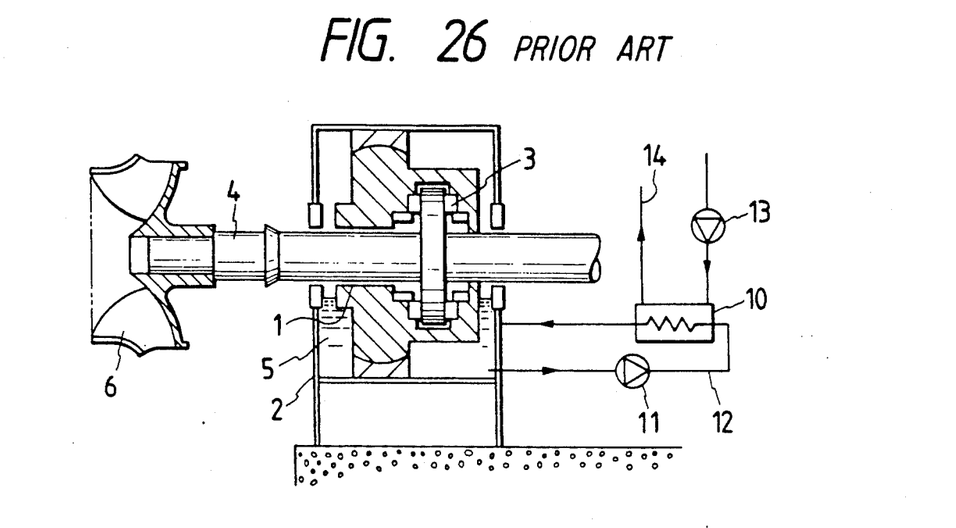
FIG. 26 is a sectional view of a bearing cooling system by means of a water cooling type oil cooler of a conventional horizontal shaft water turbine generator.

Generally, in a bearing cooling system in a horizontal shaft water turbine generator having an output of not less than approximately 1,000 kw, lubricating oil is cooled by a water cooling type oil cooler and circulated by a water circulating pump. FIG. 26 shows a bearing cooling system using a water cooling type oil cooler in a conventional horizontal shaft water turbine generator provided with a journal bearing 1 and a thrust bearing 3. The heat generated from the journal bearing 1 and the thrust bearing 3 is absorbed by lubricating oil 5. The lubricating oil, which has absorbed the heat, is cooled by a separately provided water cooling type oil cooler 10 having a water supply pump 13 and a water supply piping 14 and is circulated to the journal bearing 1 and the thrust bearing 3.

However, the bearing cooling system using a water cooling type oil cooler for cooling the lubricating oil 5 has a disadvantage in that it requires expensive equipment such as a water feeding pump 11 and oil piping 12 which require labor for maintenance and inspection. Further, if dirty cooling water is used, the water supply piping 14 may clog or corrode which would cause a failure or water leakage.

Figure 27:
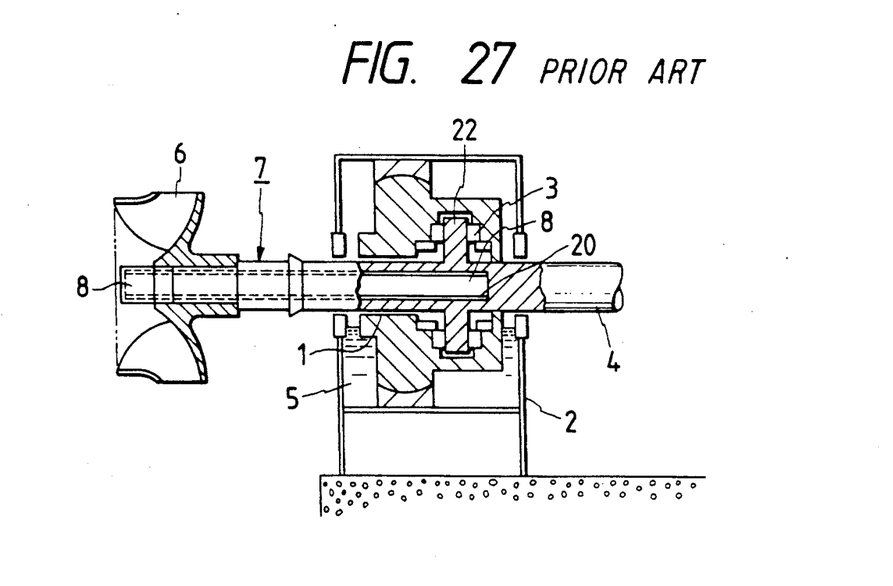
FIG. 27 is a sectional view of a bearing cooling system using a rotary shaft heat pipe of a conventional horizontal shaft water turbine generator.

FIG. 27 shows a bearing cooling system using a rotary shaft heat pipe of a conventional horizontal shaft water turbine generator. The bearing cooling system includes a bearing stand 2, a rotary shaft 4, a runner (sometimes referred to herein as a moving blade) 6, a rotary shaft heat pipe 7, a vapor space 8, a hydraulic working fluid 20, and a thrust collar 22. In FIG. 27, the inside of the rotary shaft 4 is hollow; and the hydraulic working fluid 20 is sealed in the hollow portion forming a heat pipe with the bearing side of the rotary shaft 4 as a heat generating portion and with the vapor space 8 of the moving blade 6 as a condensing portion.

In FIG. 27, most of the heat generated at the journal bearing 1 and at the thrust bearing 3 flows into the rotary shaft heat pipe 7. During that time the heat resistance increases in the thrust bearing 3 side from the heat generating portion of the thrust collar 22 to the heat pipe surface, i.e., the temperature difference therebetween is large, and the heat resistance on the evaporating surface of the heat pipe increases. The difference in temperature is great due to the fact that the heat flux becomes large for the following reasons:

(1) There is a long distance between the heat generating portion and the evaporating surface of the heat pipe for heat conduction.

(2) The heat conductivity in the thrust collar 22 and the heat flux ($W/cm^2$) on the evaporation surface of the heat pipe are both large.

(3) Generally, the thrust collar is designed so as to be uniform in thickness. Thus, the heat conduction area as well as the area of the evaporating surface decreases from the heating portion of the thrust collar 22 toward the central portion of the rotary shaft. Accordingly, the temperature at the bearing portion may exceed an allowable limit, so that it was difficult to cool the thrust collar with the bearing cooling system of the horizontal shaft water turbine generator which has an output of not less than approximately 1,000 kw.

Figure 28:
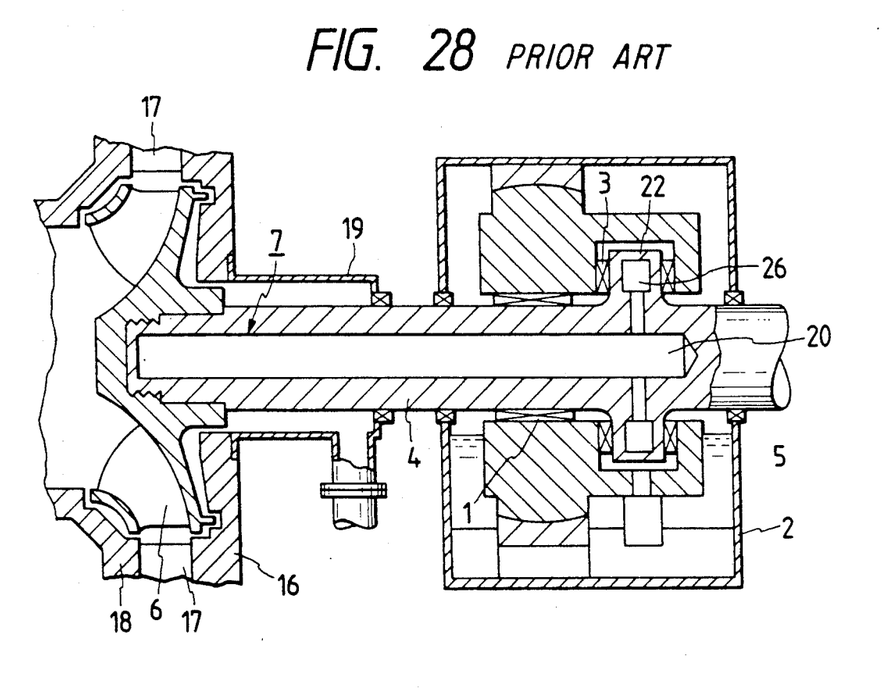
FIG. 28 is a sectional view of a bearing cooling system using a rotary shaft heat pipe of a second conventional horizontal shaft water turbine generator.

FIG. 28 shows a bearing cooling system using another rotary shaft heat pipe, in which a hollow portion 26 is provided in a thrust collar 22 so as to communicate with a condensing portion of a rotary shaft heat pipe 7. In this bearing cooling system, however, at a heat conduction portion between the heat generating portion of the thrust collar 22 of the thrust bearing 3 and the hydraulic working fluid (onto which large thrust force is applied), at a heat conduction portion between the heat generating portion of the journal bearing 1 and the hydraulic working fluid 20, and at a heat conduction portion between the hydraulic working fluid 20 on the side of a water turbine and flowing water, the more the output is increased, the more the thrust force and the bearing load increase, so that the shaft is increased in thickness as well as in size so that the heat loss increases and heat flux also increases. Accordingly, the heat conduction resistance (a temperature difference) becomes large at each heat conduction portion because the heat resistance is in direct proportion to the product of the heat conduction distance and the heat flux, so that, also in this case, the temperature at the bearing portion may exceed an allowable limit and it is difficult to cool the thrust collar to the bearing cooling system of the horizontal shaft water turbine generator which has an output of not less than approximately 1,000 kw.

Conventionally, in a valve turbine and a Kaplan turbine, a hole is formed in a rotary shaft thereof which causes a water turbine runner vane angle to be variable in accordance with the output of the turbine. Accordingly, it is difficult to use a shaft hole of the rotary shaft of such a turbine as a rotary shaft heat pipe.

SUMMARY OF THE INVENTION

It is therefore an object of the present invention to provide a bearing cooling system of a horizontal shaft water turbine generator such that when heat generated from a journal bearing and a thrust bearing of a horizontal shaft water turbine generator is cooled by a rotary shaft heat pipe, a heat conduction resistance between a heat generating portion and a hydraulic working fluid and a heat conduction resistance between the hydraulic working fluid and a condensing portion are reduced, and a central shaft hole of a rotary shaft is not used.

It is another object of the present invention to provide a bearing cooling system in a horizontal shaft water-turbine generator using a rotary shaft heat pipe in which a hydraulic working fluid in the heat pipe is forced toward the outer circumference of the heat pipe by the centrifugal force due to rotation of the rotary shaft. A fluid film on a condensing surface is made thick, heat conductively in condensation is prevented from lowering, and heat conduction resistance from the hydraulic working fluid to the condensing portion becomes smaller. Thus the heat pipe can be used for the bearing cooling system in a generator having a large capacity.

It is further object of the present invention to provide a bearing cooling system in a horizontal shaft water turbine generator using a rotary shaft heat pipe which reduces heat conduction resistance between a thrust collar sliding portion and a hydraulic working fluid in the heat pipe.

It is a further object of the present invention to provide a bearing cooling system in a horizontal shaft water turbine generator using a rotary shaft heat pipe which reduces convection heat resistance of a water-passing portion at a condensing portion of the heat pipe, and which shortens the axial length of the heat pipe.

Other features and advantages of the present invention will be apparent to one skilled in the art from the following description taken in connection with the accompanying drawings.

In order to attain the above objects, according to a first aspect of the present invention, in a horizontal shaft water turbine generator in which a rotary shaft directly connected to a runner is horizontally supported by a journal bearing and a thrust bearing which are provided outside a casing, and a heat pipe is formed in the rotary shaft by the journal and thrust bearings and a runner-side water-passing portion exposed on a water path so that the journal and thrust bearings act as heat generating portions and the runner-side water-passing portion acts as a condensing portion, the bearing cooling system comprises: a cylindrical hollow portion provided on an outer circumference of the rotary shaft and extended from the journal and thrust bearings so as to communicate with the runner-side water-passing portion; a disc-like hollow portion provided outside a sliding portion of a thrust collar of the thrust bearing so as to communicate with the cylindrical hollow portion; and a hydraulic working fluid sealed in the cylindrical and disc-like hollow portions so as to form the heat pipe.

In order to attain the above objects, according to a second aspect of the present invention, in a horizontal shaft water turbine generator in which a rotary shaft directly connected to a runner is horizontally supported by a journal bearing and a thrust bearing which are provided outside a casing, and a heat pipe is formed in the rotary shaft by the journal and thrust bearings and a runner-side water-passing portion exposed on a water path so that the journal and thrust bearings act as heat generating portions and the runner-side water-passing portion acts as a condensing portion, the bearing cooling system comprises: a heat pipe outer container attached to the rotary shaft to form a hollow portion extending from an outer circumference of the rotary shaft and the thrust bearing so as to communicate with the runner-side water-passing portion; a plurality of radiating fins provided on the heat pipe outer container in the vicinity of the runner-side water-passing portion so as to project in the direction from an outer circumference to an inner circumference of the heat pipe outer container and so as to extend in the axial direction of the heat pipe outer container; and a hydraulic working fluid sealed in the hollow portion so as to form the heat pipe.

In order to attain the above objects, the bearing cooling system according to a first embodiment of the second aspect of the present invention further comprises thrust collar ribs projected from the heat pipe outer container at the heat generating portion of the heat pipe so as to form radial hollow portions between the heat pipe outer container and a thrust collar of the thrust bearing.

In order to attain the above objects, the bearing cooling system according to a second embodiment of the second aspect of the present invention further comprises: radiating fins provided on the heat pipe outer container at the condensing portion of the heat pipe so as to project in the direction from an outer circumference to an inner circumference of the heat pipe outer container and so as to extend in the axial direction of the heat pipe outer container; and container outer ribs provided on the heat pipe outer container so as to project radially from the outer circumference of the heat pipe outer container and so as to extend in the axial direction of the heat pipe outer container.

In the bearing cooling system according to the first aspect of the present invention, the rotary shaft heat pipe is formed in a manner so that the cylindrical hollow portion is provided on the outer circumference of the rotary shaft, the disc-like hollow portion is provided on the outside of the sliding portion of the thrust collar of the thrust bearing so as to communicate with the cylindrical hollow portion, and the hydraulic working fluid is sealed in the hollow portions, so that the heat conduction distance from the sliding portion of the thrust collar to the hydraulic working fluid and the heat conduction distance from the sliding portion of the journal bearing to the hydraulic working fluid are shortened, and the heat conduction distance from the water-passing portion and the heat pipe condensing portion can be shortened. Accordingly, the heat conduction resistance can be made small.

In the bearing cooling system according to the second aspect of the present invention, the heat pipe is formed in a manner so that the heat pipe outer container is attached to the rotary shaft so as to cover the outer circumference of the rotary shaft and the thrust collar of the thrust bearing to thereby form the hollow portion extending from the journal bearing and the thrust bearing so as to communicate with the runner-side water-passing portion, the hydraulic working fluid being sealed in the hollow portion, and the axial radiating fins are provided on the heat pipe outer container in the vicinity of the runner-side water-passing portion, the hydraulic working fluid being always urged to the outer circumference of the heat pipe while the rotary shaft is rotating. Accordingly, the fluid film adhering to the radiating fins on the inner-diameter side is thin, and the operation area of the rotating heat pipe is always ensured, so that the area of the condensing portion can be increased, and the heat conduction resistance can be made small. In the bearing cooling system according to the above-mentioned first embodiment of the second aspect of the present invention, the thrust collar ribs are provided so as project from the heat pipe outer container at the heat generating portion of the heat pipe to form the radial hollow portions between the heat pipe outer container and the thrust collar of the thrust bearing, so that the heat transmission area at the heat generating portion is increased, and the hollow portion is reinforced so that the disc-like sliding portion can be made thin. By making the disc-like sliding portion thin and by increasing the heat transmission area, the heat resistance at the thrust collar portion can be reduced.

In the bearing cooling system according to the above-mentioned second embodiment of the second aspect of the present invention, the radiating fins are provided on the heat pipe outer container at the condensing portion of the heat pipe so as to project in the direction from an outer circumference to an inner circumference of the heat pipe outer container and so as to extend in the axial direction of the heat pipe outer container, and the container outer ribs are provided on the heat pipe outer container so as to project radially from the outer circumference of the heat pipe outer container and so as to extend in the axial direction of the heat pipe outer container. Accordingly, since the heat conduction distance is shortened so that the container outer ribs act as radiating fins, the heat transmission is used as radiating fins, the heat transmission area is increased, the heat resistance is reduced, and the axial length of the water-passing portion can be shortened.

BRIEF DESCRIPTION OF THE DRAWINGS

The accompanying drawings, which are incorporated in and constitute part of this specification, illustrate four embodiments of the invention and, together with the description, serve to explain the principles of the invention.

Of the drawings.

DETAILED DESCRIPTION OF PREFERRED EMBODIMENTS

Figure 1:
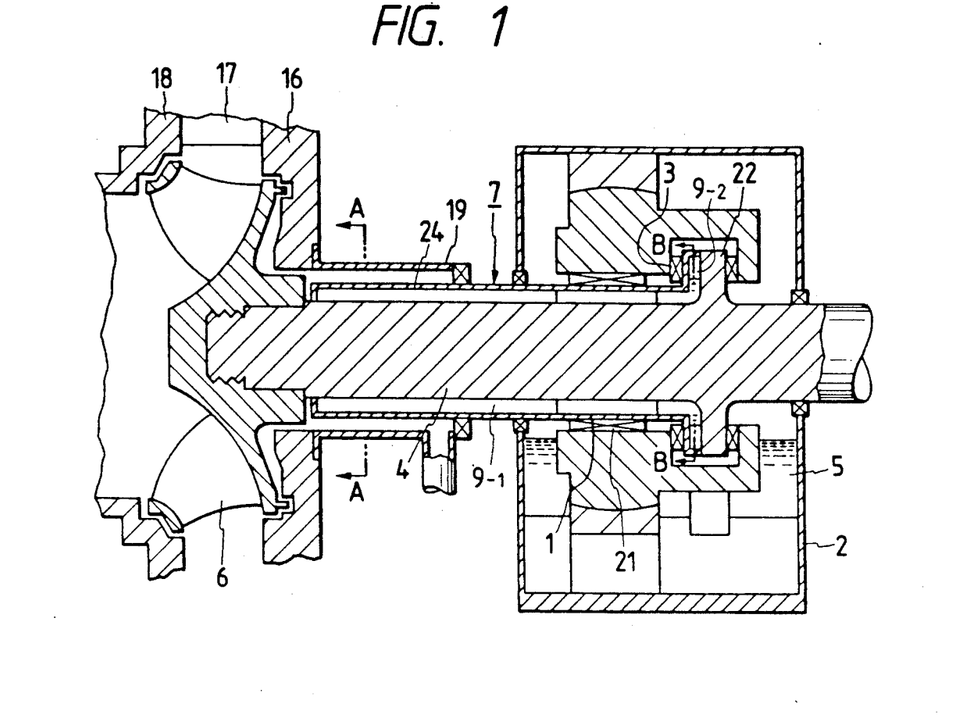
FIG. 1 is a sectional view of an embodiment of the bearing cooling system of the horizontal shaft water turbine generator according to the present invention.
Figure 2:
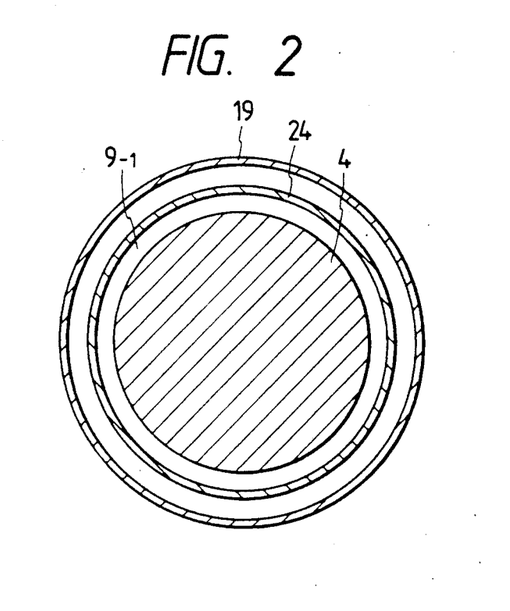
FIG. 2 is a sectional view taken on a line A—A in FIG. 1.
Figure 3:
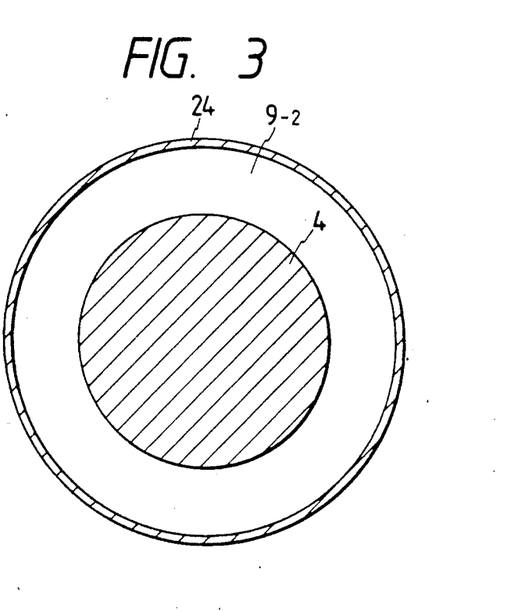
FIG. 3 is a sectional view taken on a line B—B in FIG. 1.
Figure 4:
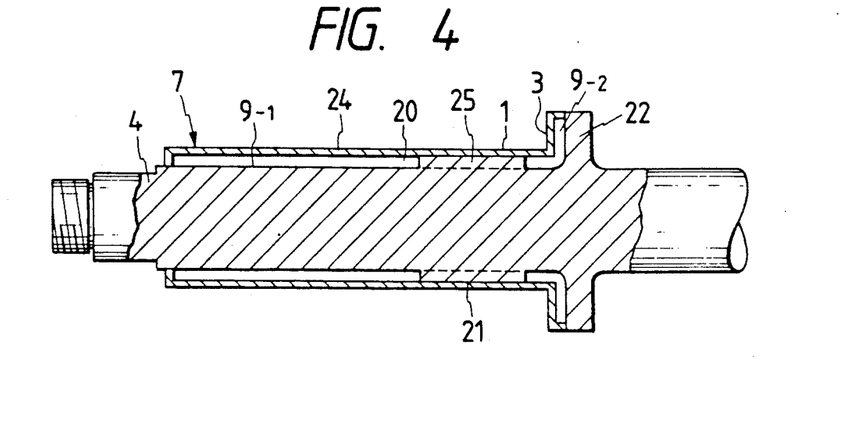
FIG. 4 is a sectional view of a rotary shaft heat pipe of the bearing cooling system.
Figure 5:
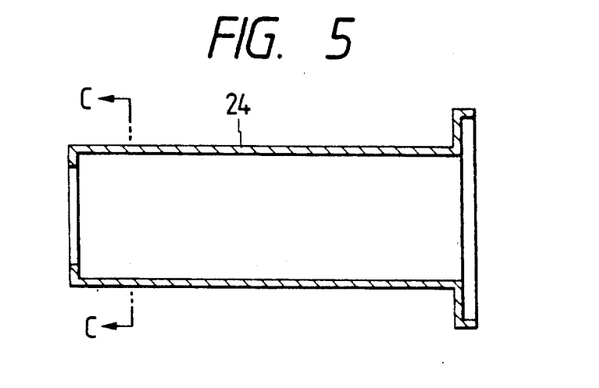
FIG. 5 is a sectional view of an outer container of the heat pipe in FIG. 4.
Figure 6:
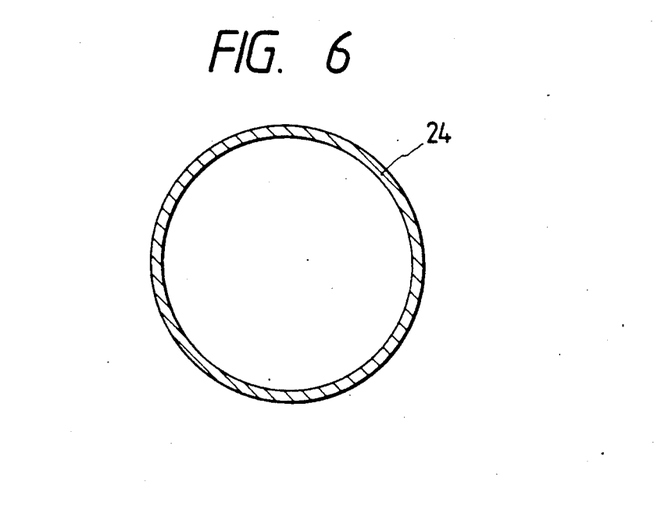
FIG. 6 is a sectional view taken on a line C—C in FIG. 5.

Referring to the drawings, embodiments of the bearing cooling system of the horizontal shaft water turbine generator according to the present invention will be described hereunder. First, an embodiment of the bearing cooling system of the horizontal shaft water turbine generator according to the present invention will be described in detail by referring to FIGS. 1 through 6, in which: FIG. 1 is a sectional view of the bearing cooling system, FIG. 2 is a sectional view taken on a line A—A in FIG. 1, FIG. 3 is a sectional view taken on a line B—B in FIG. 1; FIG. 4 is a sectional view of a rotary shaft heat pipe of the bearing cooling system, FIG. 5 is a sectional view of an outer container of the heat pipe in FIG. 4, and FIG. 6 is a sectional view taken on a line C—C in FIG. 5. In those drawings, the same parts as those in FIGS. 26, 27, and 28 are correspondingly referenced.

In FIG. 1, a rotary shaft 4 directly connected at one end to a runner 6 penetrates a casing and is horizontally supported by a journal bearing 1 and a thrust bearing 3 which are housed in a bearing stand 2. A generator (not shown) is connected to the other end of the rotary shaft 4. Lubricating oil 5 is sealed in the bearing stand 2.

FIG. 1 further provides an upper cap 16, a guide vane 17, a draft tube 18, and a water-passing tube 19. A cylindrical hollow portion $9_{-1}$ is formed on an outer circumference of the rotary shaft 4 so as to contact with the journal bearing 1 and the water-passing tube 19 on the runner-side through the heat pipe outer container 24 and a disc-like hollow portion $9_{-2}$ is formed outside a sliding portion of a thrust collar 22 of the thrust bearing 3 so as to communicate with cylindrical hollow portion $9_{-1}$ and contact with the thrust bearing 3 through the heat pipe outer container 24. A hydraulic working fluid 20 is sealed in the hollow portions $9_{-1}$ and $9_{-2}$ to form a rotary shaft heat pipe 7.

In order to form the cylindrical hollow portion $9_{-1}$ and the disc-like hollow portion $9_{-2}$, a heat pipe outer container 24 constituted by a disc-like portion and a cylindrical portion is fitted on the outer circumference of the rotary shaft 4 between the runner 6 and the thrust collar 22 at is thrust-load side sliding portion so that the disc-like portion and the cylindrical portion are connected to each other. The disc-like portion is formed so as to be disposed on the thrust collar 22 and the cylindrical portion is formed so as to extend from the disc-like portion to a passing-water cooling portion.

A groove is axially formed on the outer circumference of the rotary shaft 4 at its journal portion so as to support a journal load, and the journal portion of the rotary shaft 4 is pressed into and connected with the heat pipe outer container 24 at its journal portion so that both the journal portions are made to come in to sufficient contact with each other. In the thus-formed rotary shaft heat pipe 7, portions that contact with the thrust collar 22 and journal bearing support portion 21 are heat generating portions, and a portion that contacts with the water-passing tube 19 is a condensing portion for dissipating the generated heat. The water-passing tube 19 let the water pass through which are runner leakage water on the runner-side and water flowing into a balance pipe not shown in the figure.

In FIG. 2, the thin cylindrical heat pipe outer container 24 is provided on the outer circumference of the rotary shaft 4 to thereby form the cylindrical hollow portion $9_{-1}$, and the similarly thin water-passing tube 19 is further provided on the outside of the heat pipe outer container 24 so as to pass cooling water therein. In FIG. 3, the rotary shaft 4 per se is used as a heat pipe inner container, and the heat pipe outer container 24 is provided on the outer circumference of the rotary shaft 4 to thereby form the disc-like hollow portion $9_{-2}$. The hydraulic working fluid is filled in the disc-like hollow portion $9_{-2}$. FIG. 4 is a sectional view of the rotary shaft heat pipe 7. The heat pipe outer container 24 shown in FIGS. 5 and 6 is provided on the outer circumference of the rotary shaft 4, and the opposite sides of the heat pipe outer container 24 are connected to the rotary shaft 4 so as to form a heat pipe container.

FIG. 4 illustrates the journal bearing support portion and a journal portion supporting rib 25.

Although the rotary shaft is used as a heat pipe inner container in this embodiment, a double-tube structure in which a heat pipe inner container and a heat pipe outer container are separately provided may be employed as a modification. The function of the double-tube structure is the same as that in the embodiment.

In the conventional rotary shaft heat pipe, the rotary shaft which is an outside container of a heat pipe functions to transmit large torque and to bear main strength for supporting a runner at one side of the rotary shaft. Accordingly it is necessary to make the rotary shaft thick. On the other hand, according to the present invention, although the feature that the rotary shaft per se functions to transmit torque and bear main strength for supporting the runner at one side of the rotary shaft, the heat pipe outer container bears only slight torque transmission and the force for supporting the runner at one side of the rotary shaft is not exerted on the heat pipe outer container. Accordingly, the heat pipe outer container can be reduced in thickness.

When the rotary shaft 4 receives thrust force and the thrust bearing 3 and the thrust collar 22 generate heat by the friction therebetween, the heat at a pad portion of the thrust bearing 3 is transmitted to the lubricating oil 5. On the other hand, the heat at the heat pipe heat generating portion is transmitted to a vapor space 8 of the rotary shaft heat pipe 7 to reach the hydraulic working fluid 20 to make the hydraulic working fluid 20 evaporate into vapor. The vapor moves to the runner 6 side of a condensing portion, cooled at the water-passing portion, and condensed into the original fluid. The fluid is returned to the heat generating portion side by the action of centrifugal force caused by the rotation of the rotary shaft 4. A part of the heat transmitted to the lubricating oil 5 is released from the outer surface of the bearing stand 2 into the air. The hydraulic working fluid 20 is sealed under reduced pressure by a quantity sufficient for the thrust surface.

In the cycle in which the hydraulic working fluid 20 is circulated in a manner so that it is evaporated by the heat of the thrust bearing 3 and condensed into the original fluid at the condensing portion (the water-passing portion), the fluid is also evaporated into vapor by the heat of the journal portion of the journal bearing 1 so that the vapor is similarly moved to the cooling portion, condensed into the original fluid, and returned to the heat generating portion (bearing side) by the action of the centrifugal force. The condensing portion is constituted by a runner boss seal portion and a water sealing portion constituted by the water-passing tube. The heat is absorbed into the water flowing in those portions.

Figure 7:
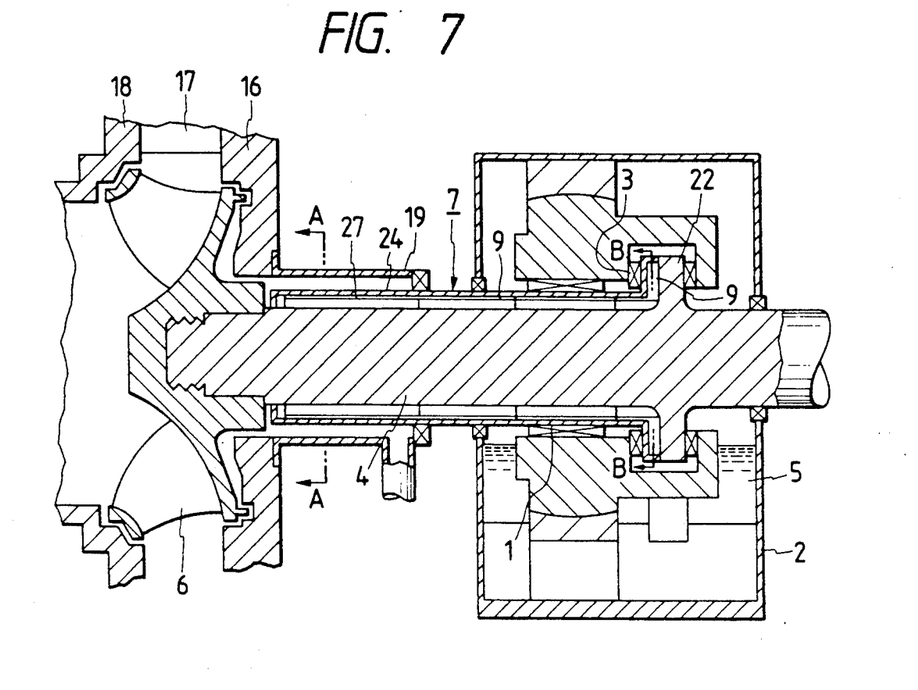
FIG. 7 is a sectional view of another embodiment of the bearing cooling system of the horizontal shaft water turbine generator according to the present invention.
Figure 8:
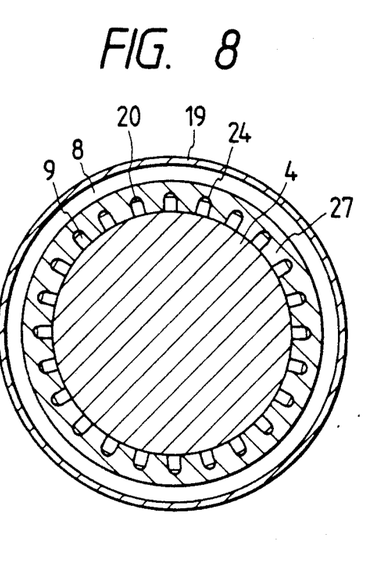
FIG. 8 is a sectional view taken on a line A—A in FIG. 7.
Figure 9:
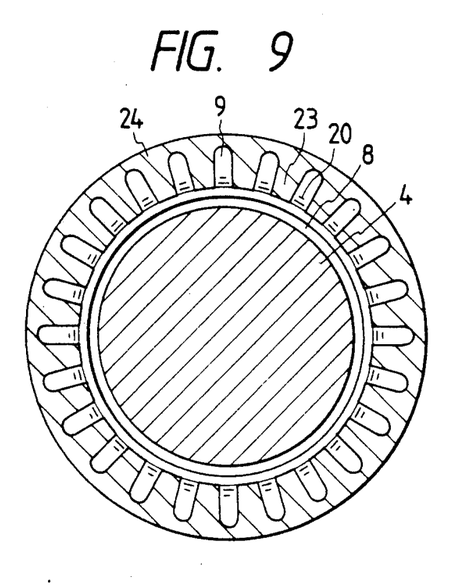
FIG. 9 is a sectional view taken on a line B—B in FIG. 7.

Next, another embodiment of the bearing cooling system of the horizontal shaft water turbine generator according to the present invention will be described in detail hereunder by referring to FIGS. 1 through 9, in which FIG. 7 is a sectional view of the bearing cooling system, FIG. 8 is a sectional view taken on a line A—A in FIG. 7, and FIG. 9 is a sectional view taken on a line B—B in FIG. 7. In those drawings, the same parts as those in FIGS. 1 through 6 are correspondingly referenced.

In FIG. 7, a rotary shaft 4 directly connected at its one end to a runner 6 penetrates a casing and is horizontally supported by a journal bearing 1 and a thrust bearing 3 which are housed in a bearing stand 2. A generator (not shown) is connected to the other end of the rotary shaft 4. Lubricating oil 5 is sealed in the bearing stand 2.

A heat pipe is configured in a manner so that a heat pipe outer container 24 is attached to the rotary shaft 4 so as to cover the outer circumference of the rotary shaft 4 and a thrust collar 22 of the thrust bearing 3, and so as to form hollow portions 9 extending from the journal bearing 1 and the thrust bearing 3 to communicate with the water-passing portion on the runner 6 side, and a plurality of radiating fins 27 are provided on the heat pipe outer container 24 in the vicinity of the water-passing portion on the runner 6 side so as to be projected in the direction from the outer circumference to the inner circumference of the heat pipe outer container 24 to be axially extended, a hydraulic working fluid 20 being sealed in the hollow portions 9.

FIG. 7 further provides an upper cap 16, a guide vane 17, a draft tube 18, and a water-passing tube 19.

FIG. 8 shows that the heat pipe outer container 24 is provided with the plurality of axially extending radiating fins 27 formed on the inner circumference thereof at the condensing portion of the rotary shaft heat pipe 7. FIG. 9 shows that thrust collar ribs 23 are provided on the thrust collar 22 of the thrust bearing 3 so that the hollow portions 9 are formed between the thrust collar ribs 23 so as to communicate with the condensing portion.

Figure 10:
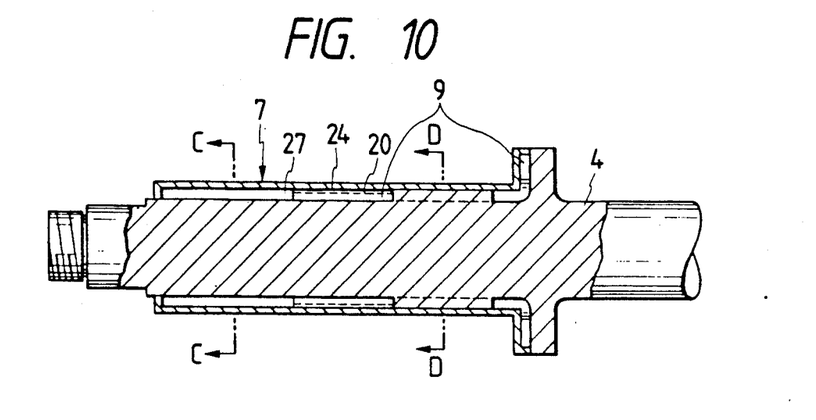
FIG. 10 is a sectional view of a rotary shaft heat pipe in FIG. 7.
Figure 11:
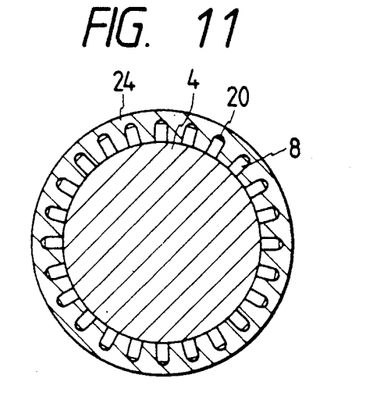
FIG. 11 is a sectional view taken on a line C—C in FIG. 10.
Figure 12:
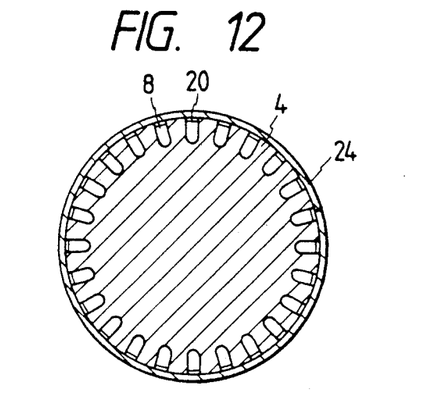
FIG. 12 is a sectional view taken on a line D—D in FIG. 10
Figure 13:
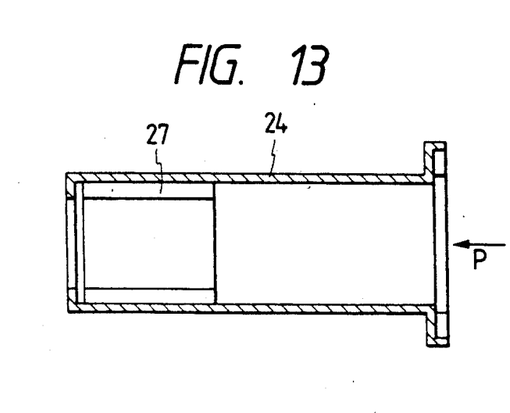
FIG. 13 is a sectional view of an outer container of the heat pipe in FIG. 10.
Figure 14:
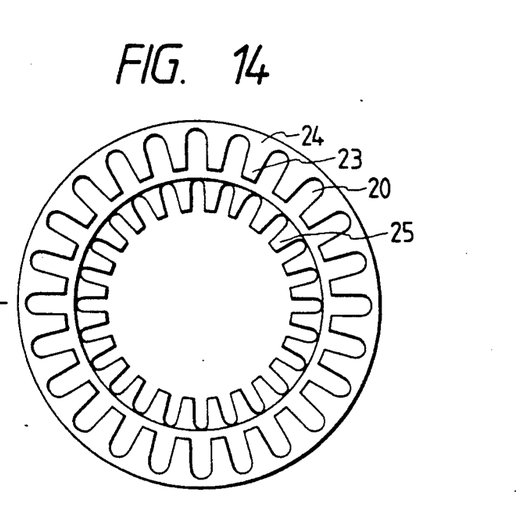
FIG. 14 is a view viewed from the P direction in FIG. 13.

FIG. 10 is a vertical sectional view of the rotary shaft heat pipe of the bearing cooling system in FIG. 7, FIG. 11 is a sectional view taken on a line C—C in FIG. 10, FIG. 12 is a sectional view taken on a line D—D in FIG. 10, FIG. 13 is a vertical sectional view of the heat pipe outer container 24 in FIG. 10, and FIG. 14 is that viewed from the direction P in FIG. 13.

In FIGS. 10, 11, 12, and 13, a groove is axially formed on the outer circumference of the rotary shaft 4 at its journal portion so as to support a journal load, and the journal portion of the rotary shaft 4 is pressed into and connected with the heat pipe outer container 24 at its journal portion so that both the journal portions are made to come into sufficient contact with each other. The heat pipe outer container 24 is provided with the plurality of axially extending radiating fins 27 formed on the inner circumference thereof so as to project inwardly at the condensing portion. In the thus formed rotary shafted heat pipe 7, the thrust collar 22 and the journal bearing 1 are heat generating portions, and water leaking between the runner boss portion and the upper cap 16 of the runner-side and water flowing into a balance pipe are caused to pass axially in contact with the water-passing tube 19 so that heat is absorbed into the water in this portion.

When the rotary shaft 4 receives thrust force so that the thrust bearing 3 and the thrust collar 22 generate heat by the friction therebetween, the heat at a pad portion of the thrust bearing 3 is transmitted to the lubricating oil 5. On the other hand, the heat at the heat pipe sliding portion is transmitted to the hydraulic working fluid 20 of the thrust collar 22 in FIG. 14. The heat at the journal portion is transmitted to the hydraulic working fluid 20 through the heat pipe outer container 24 so that the hydraulic working fluid is evaporated into vapor. The vapor moves to the runner 6 side condensing portion, comes into contact with the radiating fins 27 and is cooled with the flowing water, and condensed into the original fluid. The condensed fluid is radially urged outward by the centrifugal force caused by the rotation of the rotary shaft 4, and is returned to the large heat generating portion (bearing side) through smoothing action. A part of the heat transmitted to the lubricating oil 5 is released from the outer surface of the bearing stand into the air. The hydraulic working fluid 20 is sealed under reduced pressure by a quantity sufficient to fill the hollow portion of the thrust collar 22.

Figure 15:
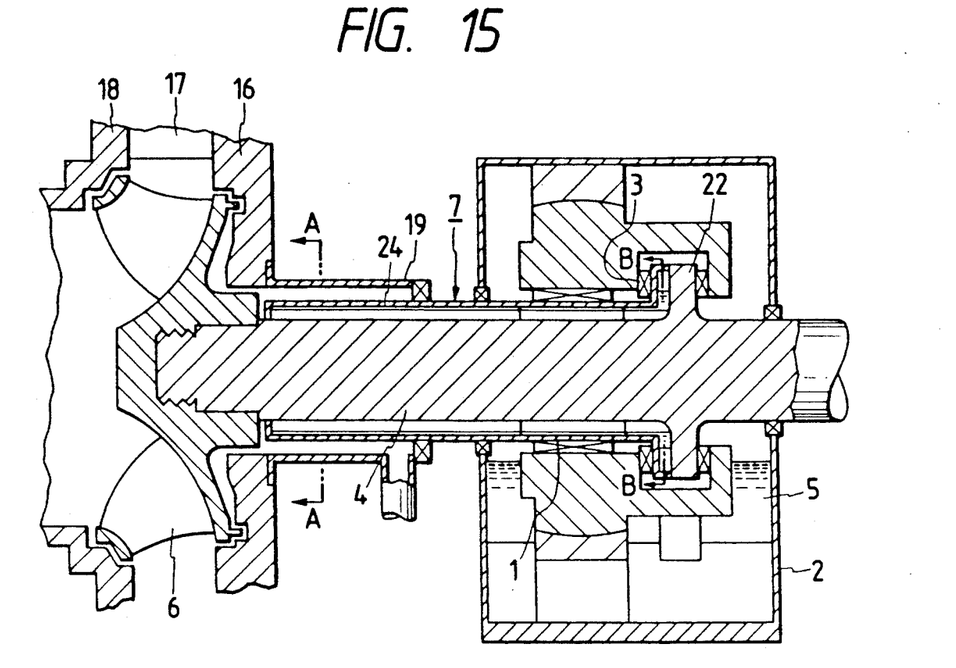
FIG. 15 is a sectional view of a further embodiment of the bearing cooling system of the horizontal shaft water turbine generator according to the present invention.
Figure 16:
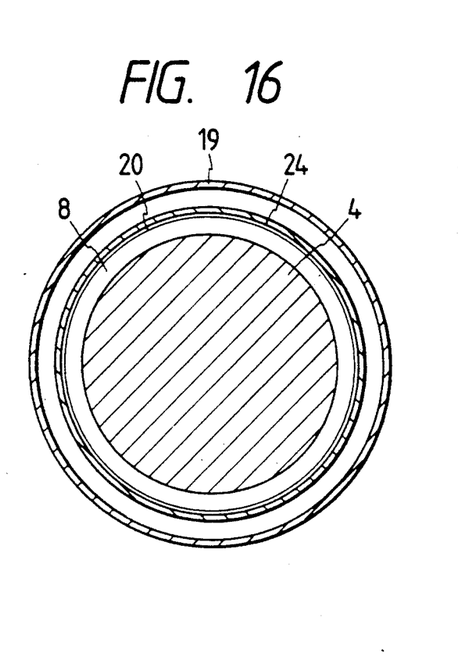
FIG. 16 is a sectional view taken on a line A—A in FIG. 15.
Figure 17:
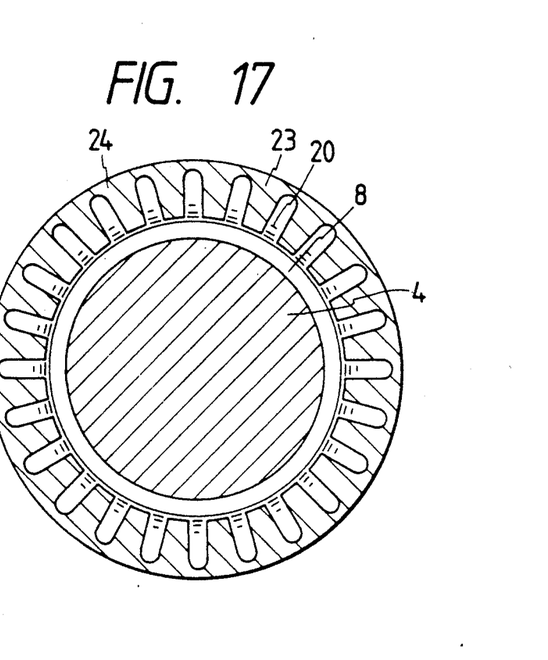
FIG. 17 is a sectional view taken on a line B—B in FIG. 15.
Figure 18:
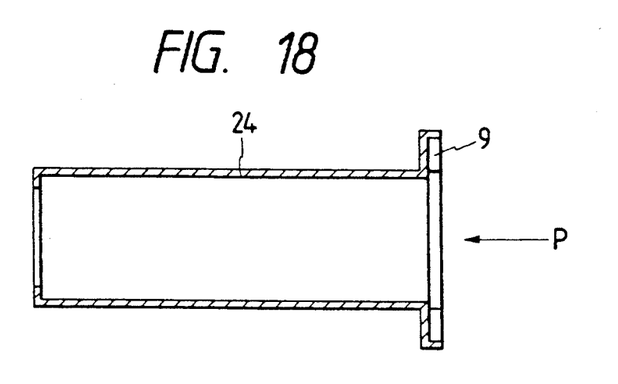
FIG. 18 is sectional view of a heat pipe outer container in FIG. 15.

FIG. 15 is a sectional view of a third embodiment of the bearing cooling system of the horizontal shaft water turbine generator according to the present invention, FIG. 16 is a sectional view taken on a line A—A in FIG. 15, FIG. 17 is a sectional view taken on a line B—b in FIG. 15, FIG. 18 is a sectional view of a heat pipe outer container in FIG. 15, and FIG. 9 is a view viewed in the P direction in FIG. 18.

In FIG. 15, a rotary shaft 4 directly connected at its one end to a runner 6 penetrates a casing and is horizontally supported by a journal bearing 1 and a thrust bearing 3 which are housed in a bearing stand 2. A generator (not-shown) is connected to the other end of the rotary shaft 4. Lubricating oil 5 is sealed in the bearing stand 2. A heat pipe 7 is formed by a heat pipe outer container 24 attached to the rotary shaft 4 so as to cover the outer circumference of the rotary shaft 4 and a thrust collar 22 of the thrust bearing 3 to form a hollow portion extending from the journal bearing 1 and the thrust bearing 3 so as to communicate with a runner 6 side water-passing portion; thrust collar ribs 23 are provided so as to project from the heat pipe outer container 24 at the heat generating portion of the heat pipe to form radial hollow portions between the heat pipe outer container 24 and the thrust collar 22; and a hydraulic working fluid is sealed in the hollow portions.

The thrust collar 22 and the heat pipe outer container 24 are arranged so that the thrust force of the thrust collar 22 acts against the heat pipe outer container 24 in the axial direction of the thrust collar 22. This rotary shaft heat pipe 7 is configured so that the thrust collar 22 and the journal bearing 1 are made to act as heat generating portions, and that water leaking between a runner boss portion and an upper cap on the runner 6 side and water flowing in a balance pipe are caused to pass in a water-passing pipe 19 so as to absorb the heat into the water in the water-passing pipe 19.

Figure 19:
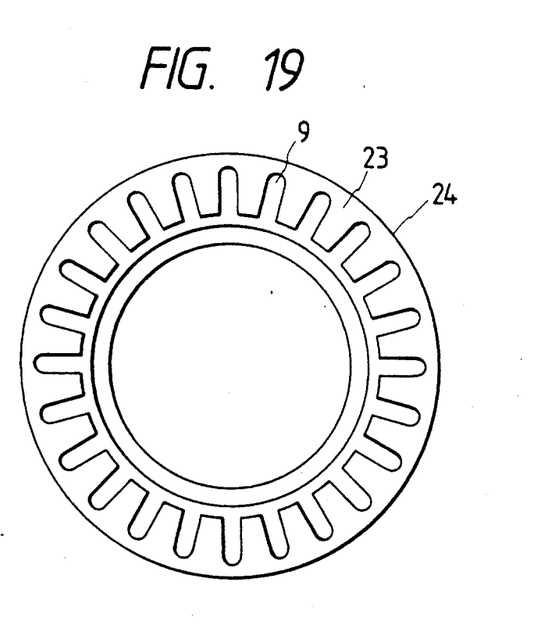
FIG. 19 is a view viewed from the P direction in FIG. 18

As shown in FIGS. 18 and 19, the thrust collar ribs 23 for forming radial hollow portions 9 are provided between the heat pipe outer container 24 and the thrust collar 22. The radial hollow portions 9 are machined through cutting from the direction shown by an arrow P in FIG. 18. The heat pipe outer container 24 is inserted onto the rotary shaft 4 from the runner-side, and the outer circumferential portion of the thrust collar 22 and one end portion of the rotary shaft 4 on the runner-side are sealed by welding or brazing. When the rotary shaft 4 rotates in response to the thrust force exerted thereto, a contact portion through an oil film between the thrust bearing 3 and the heat pipe outer container 24 is heated by the friction. The journal portion receives a gravity load to rotate to thereby generate heat.

The heat at the pad portion of the thrust bearing 3 is transmitted to the lubricating oil 5. On the other hand, the heat of a heat pipe sliding portion both at the thrust portion and the journal portion is moved by thermal conduction to the hollow portions 9 through the inside of the heat pipe outer container 24, so that the fluid in the hollow portions 9 is evaporated into vapor. The vapor is moved to a cooling portion on the runner 6 side of the heat pipe 7 so that the vapor is cooled at the water-passing portion and condensed into the original fluid. Condensed fluid is urged to the outer circumferential side by the centrifugal force caused by the rotation of the rotary shaft 4 and is returned through smoothing action to the heat generating portion (bearing side) of a large diameter. A part of the heat transmitted to the lubricating oil 5 is released from the outer surface of the bearing stand 2 into the air.

Figure 20:
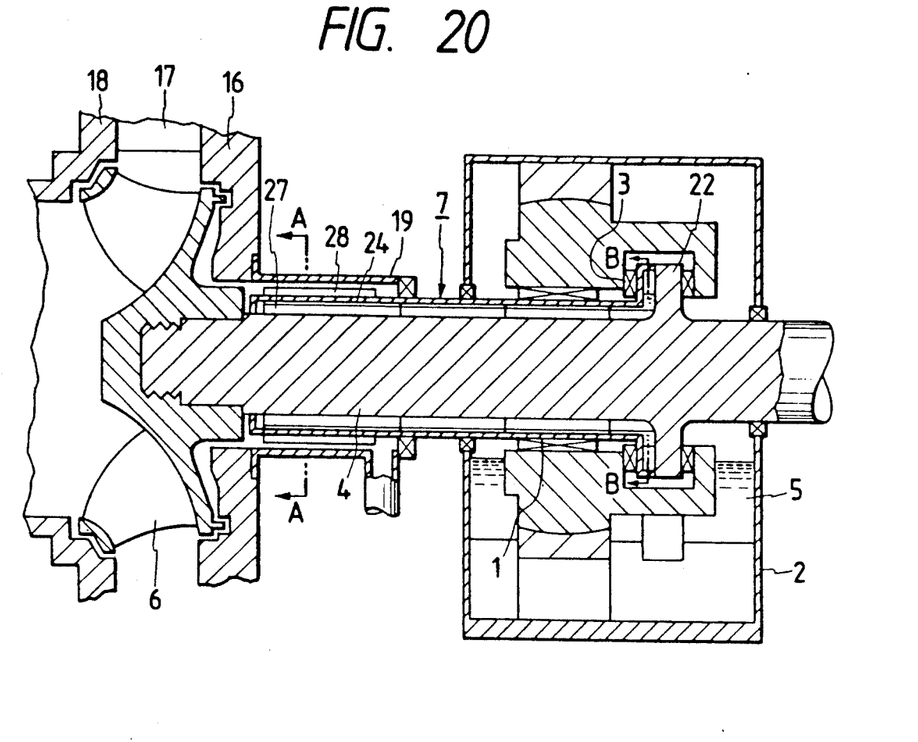
FIG. 20 is a sectional view of a still further embodiment of the bearing cooling system of the horizontal shaft water turbine generator according to the present invention.
Figure 21:
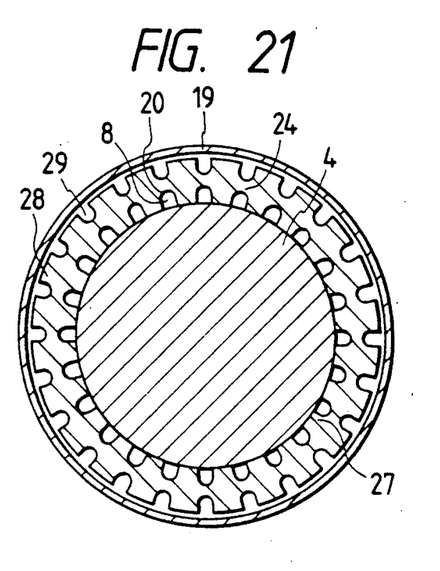
FIG. 21 is a sectional view taken on a line A—A in FIG. 20.
Figure 22:
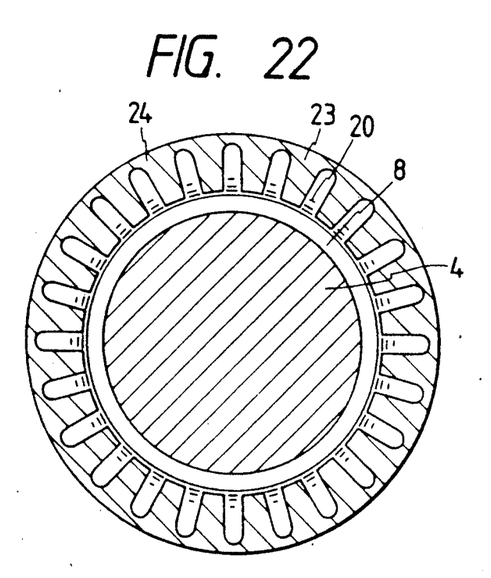
FIG. 22 is a sectional view taken on a line B—B in FIG. 20.
Figure 23:
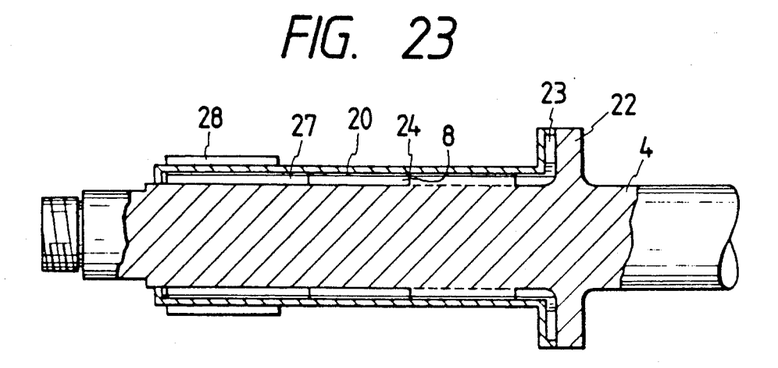
FIG. 23 is a sectional view of a rotary shaft heat pipe in FIG. 20.
Figure 24:
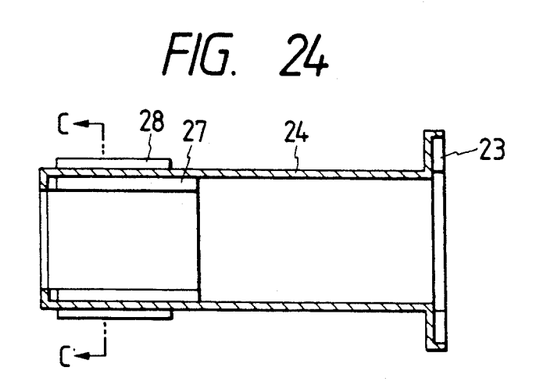
FIG. 24 is a sectional view of an outer container of the heat pipe in FIG. 23.
Figure 25:
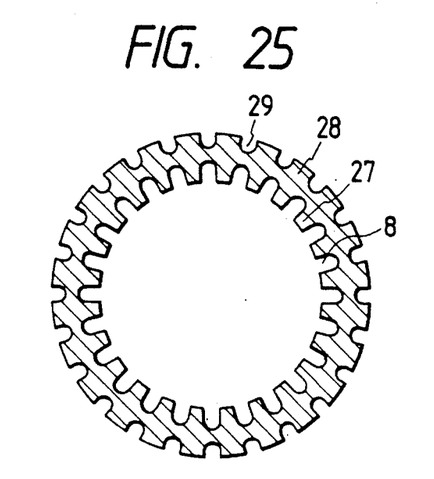
FIG. 25 is a sectional view taken on a line C—C in FIG. 24.

FIG. 20 is a sectional view of a fourth embodiment of the bearing cooling system of the horizontal shaft water turbine generator according to the present invention, FIG. 21 is a sectional view taken on a line A—A in FIG. 20, FIG. 22 is a sectional view taken on a line B—B in FIG. 20, FIG. 23 is a sectional view of a rotary shaft heat pipe in FIG. 20, FIG. 24 is a sectional view of a heat pipe outer container, and FIG. 25 is a sectional view take on a line C—C in FIG. 24.

In FIG. 20, a rotary shaft 4 directly connected at one end to a runner 6 penetrates a casing and is horizontally supported by a journal bearing 1 and a thrust bearing 3 which are housed in a bearing stand 2. A generator (not-shown) is connected to the other end of the rotary shaft 4. Lubricating oil 5 is sealed in the bearing stand 2.

A rotary shaft heat pipe is formed by a heat pipe outer container 24 and a heat pipe inner container substituted by the rotary shaft 4. The heat pipe outer container 24 is constituted by a disc-like sliding plate provided on a thrust collar 22 and a cylindrical portion provided between a journal portion and a water cooling portion, and is provided so as to cover the outer circumference of the rotary shaft 4 between the runner and a thrust load side sliding portion of the thrust collar 22. The thrust collar hollow portions are made to communicate with the hollow portion of a condensing portion through a journal hollow portion. In the rotary shaft heat pipe 7, the thrust collar 22 and the journal bearing 1 are regarded as heat generating portions, and water leaking between a runner boss portion on the runner 6 side and an upper cap and water flowing in a balance pipe are caused to flow into a water-passing tube 19, so that the heat is absorbed into the water in the water-passing tube 19.

In FIG. 21, a plurality of radiating fins 27 are provided on the heat pipe outer container 24 at the condensing portion of the heat pipe so as to project in the direction from the outer circumference to the inner circumference of the heat pipe outer container 24 and so as to extend in the axial direction of the heat pipe outer container 24, and container outer ribs 28 are also provided on the heat pipe outer container 24 so as to project radially outward from the outer circumference of the heat pipe outer container 24. Thus, axial water-passing paths 29 are machined through cutting, or the like, in the outer circumference of the rotary shaft 4 as shown in FIG. 23 and on the outside of the heat pipe outer container 24 at the passing-water cooling portion shown in FIGS. 24 and 25.

When the rotary shaft 4 rotates in response to the thrust force exerted thereto, the thrust bearing 3 and the heat pipe outer container 24 generate heat by the friction. The journal portion rotates in response to a gravity load exerted thereto to thereby generate heat. The heat at a pad portion of the thrust bearing 3 is transmitted to the lubricating oil 5. On the other hand, the heat at the heat pipe sliding portion is transmitted to a hydraulic working fluid 20 through the thrust collar portion, and the heat at the journal portion is transmitted to the hydraulic working fluid 20 through the heat pipe outer container 24, so that the hydraulic working fluid 20 is evaporated into vapor. The vapor moves to a condensing portion on the runner 6 side and comes into contact with the radiating fins 27 which are cooling at a water-passing portion and which constitute axial vapor paths respectively, so that the vapor is condensed into the original fluid. The fluid is urged to the outer circumference side by the centrifugal force caused by the rotation of the rotary shaft 4, and is returned through smoothing action to the heat receiving portion (bearing side) having a large diameter.

The container outer ribs 28 axially provided on the heat pipe outer container 24 at the outside of the condensing portion act as radiating fins so that the heat transmission area can be enlarged to be approximately 3 to 5 times larger than in the case without such container outer ribs 28. Accordingly, the convection heat transmission resistance at the passing-water cooling portion can be reduced to be 1/3-1/5. A part of the heat transmitted to the lubricating oil 5 is released from the outer surface of the bearing stand 2 into the air.

According to an aspect of the present invention, the heat conduction distance from the thrust bearing sliding portion and the journal bearing sliding portion to the hydraulic working fluid and the heat conduction distance between the heat pipe condensing portion and the passing-water cooling portion are reduced so that the heat conduction resistance is reduced, the cooling effect of the heat pipe is improved, and the reliability of the bearings can be improved. Accordingly, it is possible to cool the bearings of horizontal shaft water turbine generators, horizontal shaft pumps, and so on, having an output of not less than 1,000 kw.

Further, the bearing cooling system can be used for cooling bearings of a valve water-turbine in which a shaft hole is used for control. Further, the machining for cutting a shaft hole in a rotary shaft at its rotational center and for cutting hollow portions in a thrust collar becomes unnecessary, and a thin heat pipe outer container is used so that the heat pipe is easily worked and the cost thereof is lowered.

According to another aspect of the present invention, in the bearing cooling system, the heat pipe is formed in a manner so that a container is attached to the rotary shaft so as to cover the outer circumference of the rotary shaft and the thrust collar and so as to form hollow portions extending from the journal bearing and the thrust bearing to communicate with the runner-side water-passing portion, and so that a plurality of the radiating fins are formed on the container in the vicinity of the runner-side water-passing portion so as to project in the direction from the outer circumference to the inner circumference of the container and so as to extend in the axial direction of the rotary shaft, and that the hydraulic working fluid is sealed in the hollow portions. Thus, the bearing cooling system has the following advantages:

(1) Since the heat transmission area of the condensing portion of the rotary shaft heat pipe is 3-5 times as large as that of the conventional heat pipe, the effective cooling area can be greatly increased.

(2) Since the centrafugal force acts onto the rotary shaft heat pipe, the inner circumferential surfaces of the radiating fins cannot be covered with thick fluid layers to reduce the heat conduction, to improve the heat conduction performance and to reduce the heat pipe in size.

(3) The bearing cooling system can be used for cooling bearings of a valve water-wheel or the like in which a shaft hole is used for control.

Accordingly, the bearing cooling system is improved in reliability and can be used for cooling bearings of a horizontal shaft pump, a horizontal shaft water turbine generator, or the like, having an output not less than 1,000 kw.

In the bearing cooling system according to the preferred embodiment of the present invention, the thrust collar ribs are formed on the heat pipe outer container at the heat generating portion of the heat pipe so as to project from the heat pipe outer container and so as to form radial hollow portions between the heat pipe outer container and the thrust collar. Thus, the bearing cooling system has the following advantages:

(1) Since a boiling heat transmission area is enlarged and the thrust collar ribs are used also as the radiating fins, the strength of the heat pipe outer container is increased, and the heat pipe outer container is never curved so that it can be prevented from deformation.

(2) Since the radial hollow portions are provided on the thrust collar side, the radiation efficiency is improved, the machining can be easily performed from the axial end surface of the heat pipe outer container.

(3) Since the thrust collar ribs are provided, the collar can be reduced in thickness without lowering the strength of the thrust collar and the heat transmission resistance can be reduced.

In the bearing cooling system according to another preferred embodiment, radiating fins are provided on the heat pipe outer container at the condensing portion of the heat pipe so as to project in the direction from an outer circumference to an inner circumference of the heat pipe outer container and so as to extend in the axial direction of the heat pipe outer container, and container outer ribs are provided on the heat pipe outer container so as to project radially from the outer circumference of the heat pipe outer container and so as to extend in the axial direction of the heat pipe container. Accordingly, the bearing cooling system has the following advantages:

(1) The effective heat transmission area of the convection heat transmission portion can be greatly enlarged to thereby reduce the convection heat transmission resistance.

(2) Under the condition that the temperature difference is fixed, the convection heat transmission resistance can be reduced, so that if the quantity of heat radiation is fixed, the axial length of the heat pipe can be made short.

(3) The bearing cooling system can be used for cooling bearings of a water wheel in which a shaft hole is used for control.

What is claimed is:

1. A bearing cooling system for a water turbine having a rotatable shaft connected at one end to a movable blade portion and supported by a journal bearing and a thrust bearing having a collar, axially spaced from the movable blade portion, the system comprising:

a first container surrounding and spaced from the rotatable shaft, said first container extending axially from a predetermined engaging position adjacent the one end of the shaft to the journal and thrust bearings, the thrust bearing engaging the outer surface of the first container, the shaft and thrust bearing and inner surface of the container defining walls of a sealed first chamber surrounding a portion of the rotatable shaft and communicating with the journal and thrust bearings, said first chamber adapted to contain a fluid for absorbing heat generated by the journal and thrust bearings; and a second container spaced from and surrounding a portion of the first container adjacent the one end of the shaft, said second container and said first container defining a second chamber for receiving and containing flowing water from the turbine for cooling the fluid in the first chamber.

2. The system of claim 1, wherein the first container includes a portion of increased diameter adjacent the bearing collar for defining a disc-like portion of the first chamber.

3. The system of claim 2, further comprising a plurality of circumferentially spaced ribs disposed in the disc-like portion of the first chamber in heat transfer communication with the collar of the thrust bearing.

4. The system of claim 3, further comprising a plurality of outer container ribs disposed on the outer wall of the first container and forming hollow axial portions in said second chamber to increase heat transfer from a fluid contained in the first chamber to the flowing water in the second chamber.

5. A bearing cooling system for a water turbine having a rotatable shaft connected at one end to a movable blade portion and supported by a journal bearing and a thrust bearing having a collar, axially spaced from the movable blade portion, the system comprising:

a first container surrounding and spaced from the rotatable shaft, said first container extending axially from a predetermined engaging position adjacent the one end of the shaft to the journal and thrust bearings, the thrust bearing engaging the outer surface of the first container, the shaft and thrust bearing and inner surface of the first container defining walls of a sealed first chamber surrounding a portion of the rotatable shaft and communicating with the journal and thrust bearings, said first container including a portion of increased diameter adjacent the thrust bearing collar for defining a disc-like portion of the first chamber, and adapted to contain a fluid for absorbing heat generated by the journal and thrust bearings; and a second container spaced from and surrounding a portion of the first container adjacent the one end of the shaft, said second container and said first container defining a second chamber for receiving and containing flowing water from the turbine for cooling the fluid in the first chamber.

6. The system of claim 5, further comprising a plurality of circumferentially spaced ribs disposed in the first chamber in engagement with said disc-like portion.

7. The system of claim 6, further comprising a plurality of outer container ribs disposed on the outer wall of the first container and forming hollow axial portions in said second chamber to increase heat transfer from a fluid contained in the first chamber to the flowing water in the second chamber.

8. In a horizontal-shaft water turbine generator in which a rotary shaft is adapted to be directly connected to a runner and is horizontally supported by a journal bearing and a thrust bearing which are provided outside a casing, and in which a heat pipe is formed in the rotary shaft by the journal and thrust bearings and a runner-side water-passing portion exposed on a water path so that the journal and thrust bearings act as heat generating portions and the runner-side water-passing portion acts as a condensing portion, a bearing cooling system comprising:

a cylindrical hollow portion provided on an outer circumference of the rotary shaft and extending from the journal and thrust bearings so as to communicate with the runner-side water passing portion;

a thrust collar for the thrust bearing, the thrust collar having a sliding portion; and a disc-like hollow portion provided outside said sliding portion of said thrust collar so as to communicate with said cylindrical hollow portion, said cylindrical and disc-like hollow portions adapted to contain a hydraulic working fluid sealed so as to form the heat pipe.

9. In a horizontal-shaft water turbine generator in which a rotary shaft is directly connected to a runner and is horizontally supported by a journal bearing and a thrust bearing, which are provided outside a casing, and a heat pipe is formed in the rotary shaft by the journal and thrust bearings and a runner-side water-passing portion exposed on a water path so that the journal and thrust bearings act as heat generating portions and the runner-side water-passing portion acts as a condensing portion, a bearing cooling system comprising:

a heat pipe outer container attached to the rotary shaft to form a hollow portion extending from an outer circumference of the rotary shaft and the thrust bearing so as to communicate with the runner-side water-passing portion; and a plurality of radiating fins provided on said heat pipe outer container in the vicinity of the runner-side water passing portion so as to project in the direction from an outer circumference to an inner circumference of said heat pipe outer container and to extend in the axial direction of said heat pipe outer container, said hollow portion adapted to contain a hydraulic working fluid sealed therein so as to form said heat pipe.

10. A bearing cooling system according to claim 9, further including a thrust collar for the thrust bearing.

11. A bearing cooling system according to claim 10, further comprising thrust collar ribs projecting from said heat pipe outer container at said heat generating portion of said heat pipe so as to form radial hollow portions between said heat pipe outer container and said thrust collar of the thrust bearing.

12. A bearing cooling system according to claim 9, further comprising:
  radiating fins provided on said heat pipe outer container at said condensing portion of said heat pipe so as to project in the direction from an outer circumference to an inner circumference of said heat pipe outer container and to extend in the axial direction of said heat pipe outer container; and
  container outer ribs provided on said heat pipe outer container so as to project radially from the outer circumference of said heat pipe outer container and to extend in the axial direction of said heat pipe outer container.

* * * * *